(12) United States Patent
Cho

(10) Patent No.: US 6,401,773 B1
(45) Date of Patent: Jun. 11, 2002

(54) PUNCTURE-COMPENSATING TIRE

(76) Inventor: Woon Je Cho, 2550 Kingston Road, Scarborough (CA), M1M1L7

( * ) Notice: Subject to any disclaimer, the term of this patent is extended or adjusted under 35 U.S.C. 154(b) by 0 days.

(21) Appl. No.: 09/520,611

(22) Filed: Mar. 7, 2000

Related U.S. Application Data

(63) Continuation of application No. 09/163,014, filed on Sep. 30, 1998, now abandoned.

(51) Int. Cl.[7] .............................................. B60C 17/06
(52) U.S. Cl. ....................... 152/158; 152/520; 152/544; 152/398; 152/399
(58) Field of Search ................................ 152/157, 158, 152/520, 544, 278–283, 397, 398, 399

(56) References Cited

U.S. PATENT DOCUMENTS

| | | | | |
|---|---|---|---|---|
| 939,638 A | * | 11/1909 | Rowling | 152/158 |
| 1,392,671 A | * | 10/1921 | Abrams | 152/278 |
| 3,283,800 A | * | 11/1966 | Ischinger et al. | 152/397 |
| 3,981,341 A | * | 9/1976 | Bauer et al. | 152/158 |
| 4,505,314 A | * | 3/1985 | Goudy | 152/398 |
| 5,479,976 A | | 1/1996 | Cho | |

* cited by examiner

Primary Examiner—Geoffrey L. Knable
(74) Attorney, Agent, or Firm—Armstrong, Westerman & Hattori, LLP

(57) ABSTRACT

A tire has a buttress system which maintains flexible cushioning to support a load on the tire, even after a puncture in the tire. The tire has a tire body with an inner rim attached to a wheel rim with a clamping piece. The buttress system is provided within the tire body and has an upper rib adjacent to the inner side of the tread portion of the tire body and a lower rib attached to the wheel rim. The upper rib is positioned across from the lower rib and is supported by the lower rib when there is a puncture in the tire. A clamping system clamps a doubly acute bead on the inner rim of the tire body to a cupped part of the wheel rim using the clamping piece. A saddle is provided to raise up the anchoring portion of the lower rib of the buttress system.

6 Claims, 2 Drawing Sheets

US 6,401,773 B1

PUNCTURE-COMPENSATING TIRE

CROSS REFERENCE TO RELATED APPLICATIONS

This is a continuation of U.S. patent application Ser. No. 09/163,014, filed Sep. 30, 1998, now abandoned, which is incorporated herein by reference.

BACKGROUND OF THE INVENTION

1. Field of the Invention

This invention generally relates to pneumatic tires mounted on wheels of various vehicles, such as automobiles, heavy-moving equipment, airplanes, and the like. In particular, the present invention is directed to an improved inner construction of a tire which provides continuously safe and reliable use even after a puncture in the tire and the shape of a bead of the tire body.

2. Description of the Related Art

Conventional one-chamber pneumatic tires, as used for automobiles and other vehicles, provide stress resistance to vertical and lateral loads, resistance to driving and braking torques, and resilience to road vibrations and shock, in order to create a comfortable ride. However, tires are subject to puncture from various road hazards, debris, and the like. They may even puncture from deliberately aimed high-penetration projectiles such as bullets.

Upon puncture of the single chamber in conventional tires, the leakage of air creates several problems. For instance, the fitting between the tire and the rim of the wheel becomes loose. The load balance between the tires of the vehicle becomes uneven. The control of the vehicle is lost. The possibility of a serious traffic accident is increased.

SUMMARY OF THE INVENTION

It is an object of the present invention to solve the above-described problems in the prior art.

It is another object of the present invention to ensure a safe operation of the vehicle even after a puncture in the tire.

It is yet another object of the present invention to prevent tire deformation, separation of the tire from the wheel rim, and the ensuring loss of vehicle stability and control upon puncture of the tire.

Another object of the present invention is to increase the longevity of a tire.

Yet another object of the present invention is to obviate conventional one-shaft, two-tire systems, such as those used in heavy vehicles, and to use a one-shaft, one-wide tire system.

A further object of the present invention is to maintain easy assembly using standard manufacturing practices for puncture-proof tires according to the present invention.

Objects of the present invention are achieved by providing a tire with a buttress system that maintains flexible cushioning to support a load on the tire, even after a puncture in the tire. The tire has a tire body with a doubly acute bead attached to a wheel rim with a clamping piece and a top wheel rim to secure air-tightness and to protect the separation of a tire body from a wheel rim. The buttress system is provided within the tire body and has an upper rib adjacent to an inner side of a tread portion of the tire body and a lower rib attached to a saddle fitted around the wheel rim. There may also be a plurality of the buttresses around the tire and attached to the saddle.

Objects of the present invention are also achieved by providing a clamping system for a tire, wherein the tire body has a doubly acute bead on the inner rim of the tire body which is clamped by the clamping piece to a cupped part of the wheel rim.

BRIEF DESCRIPTION OF THE DRAWINGS

These and other objects and advantages of the invention will become apparent and more readily appreciated from the following description of the preferred embodiments, taken in conjunction with the accompanying drawings which.

DETAILED DESCRIPTION OF THE PREFERRED EMBODIMENTS

Figure 1:
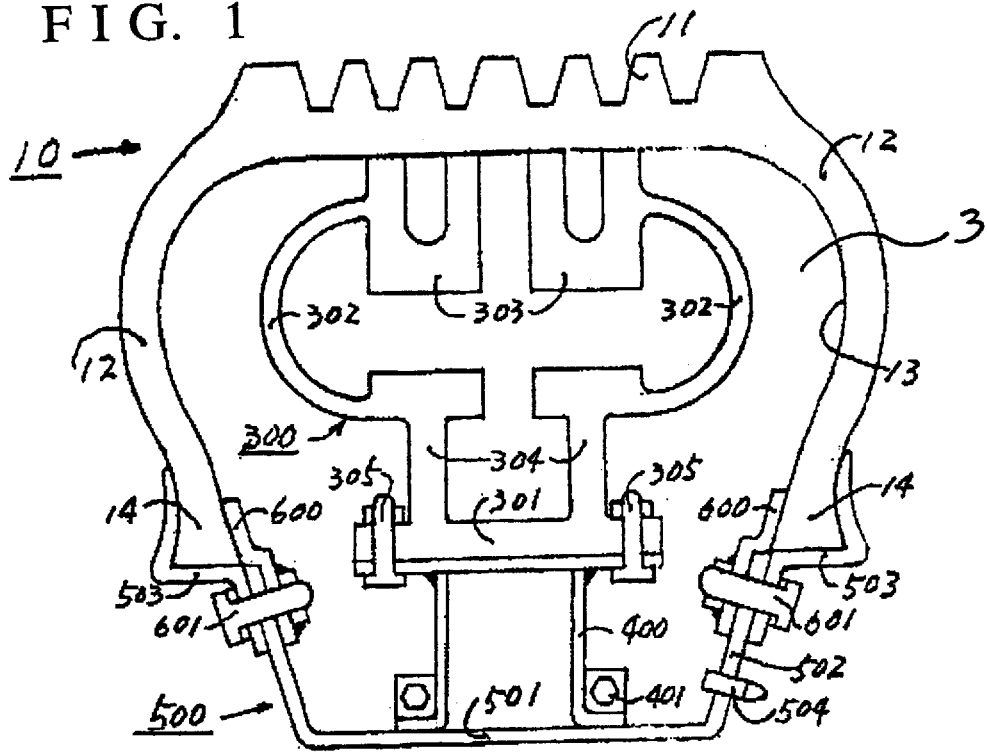
FIG. 1 is a cross sectional view of a tire according to a preferred embodiment of the present invention.

Reference will now be made in detail to a preferred embodiment of the present invention, examples of which are illustrated in the accompanying drawings FIG. 1 to FIG. 4 wherein like reference numerals refer to like elements throughout.

FIG. 1 is a cross-sectional view of a tire according to the preferred embodiment of the present invention. A tubeless tire body 10 has a generally round shape in the plane orthogonal to FIG. 1. The tire body 10 has a tread portion 11 formed between side walls 12. The tread portion 11, made of thick rubber, contacts a road surface and has various grooves that reduce skid, aid in the prevention of the crack enlargement, and assist in heat radiation. A soft rubber ply 13, secured on an inner surface of the tire body 10, hermetically maintains the compressed air within the tire body 10 and a wheel rim 500. An inner rim bead 14 having a doubly acute shape, is formed at inner ends of the side walls 12, opposite from the tread portion 11.

The tire body 10 is mounted on a wheel rim 500. The wheel rim 500 has a top wheel rim portion 503, side wheel rim portion 502, and a bottom wheel rim portion 501. The two top wheel rim portions 503 respectively having an upper cupping part that is shaped to cup the bead 14 of the tire body 10. And inside surface of the top wheel rim portion have the hermetic coating preferably. The top wheel rim portion 503 is concentric with the bottom wheel rim portion 501 and has a round shape in the plane orthogonal to FIG. 1, similar to the tread portion 11.

The doubly acute bead 14 of the tire body 10 is secured to the upper cupping part 503 and top surface of the side wheel rim 502 by a clamping system including the clamping piece 600 and the bolts and nuts with air tight washers 601 inserted through the upper cupping portion 503. This clamping system secures an air tight condition for the chamber 3 within the tire body 10 and prevents the separation of the tire body 10 from the wheel rim 500 when there is a puncture in the side walls 12 of the tire body 10.

While FIG. 1 depicts upper cupping portion 503 being bolted to the side wheel rim portion 502, the upper cupping portions 503 may also be integral with the side wheel rim portion 502.

The compressed air supply to the chamber 3 is provided through an air supply valve 504 which is mounted on the bottom wheel rim portion 501.

Figure 4:
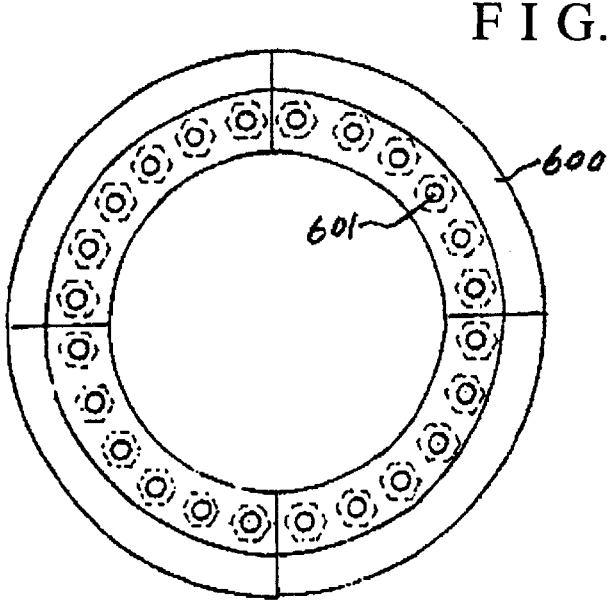
FIG. 4 is a side view of the clamping piece in the tire of FIG. 1.

FIG. 4 is a side view of the clamping piece 600. As shown, the clamping piece 600 has four sections to facilitate assembly on the wheel rim 500. However, the clamping piece 600 may be divided into a different number of sections for assembly on the wheel rim 500.

A buttress system 300 is provided for stress resistance to vertical and lateral loads with resilience and flexible cushioning. The buttress system 300 is disposed over a saddle 400. The buttress system 300 is mounted onto the outer circumference of the top portion of the saddle 400 and is positioned within the tire body 10, along a midline of the tire body 10. The buttress portion 300 is fixed firmly on the top of the saddle 400 by bolts and nuts 305. The buttress system 300 includes anchoring ribs 301, which are connected to T shaped lower ribs 304, and curved side walls 302. Upper ribs 303 are connected to the other end of the curved side walls 302 and are located opposite the lower ribs 304. To avoid creating excessive centrifugal forces during running of the vehicle, the upper ribs 303 include grooves to reduce its mass.

Figure 3:
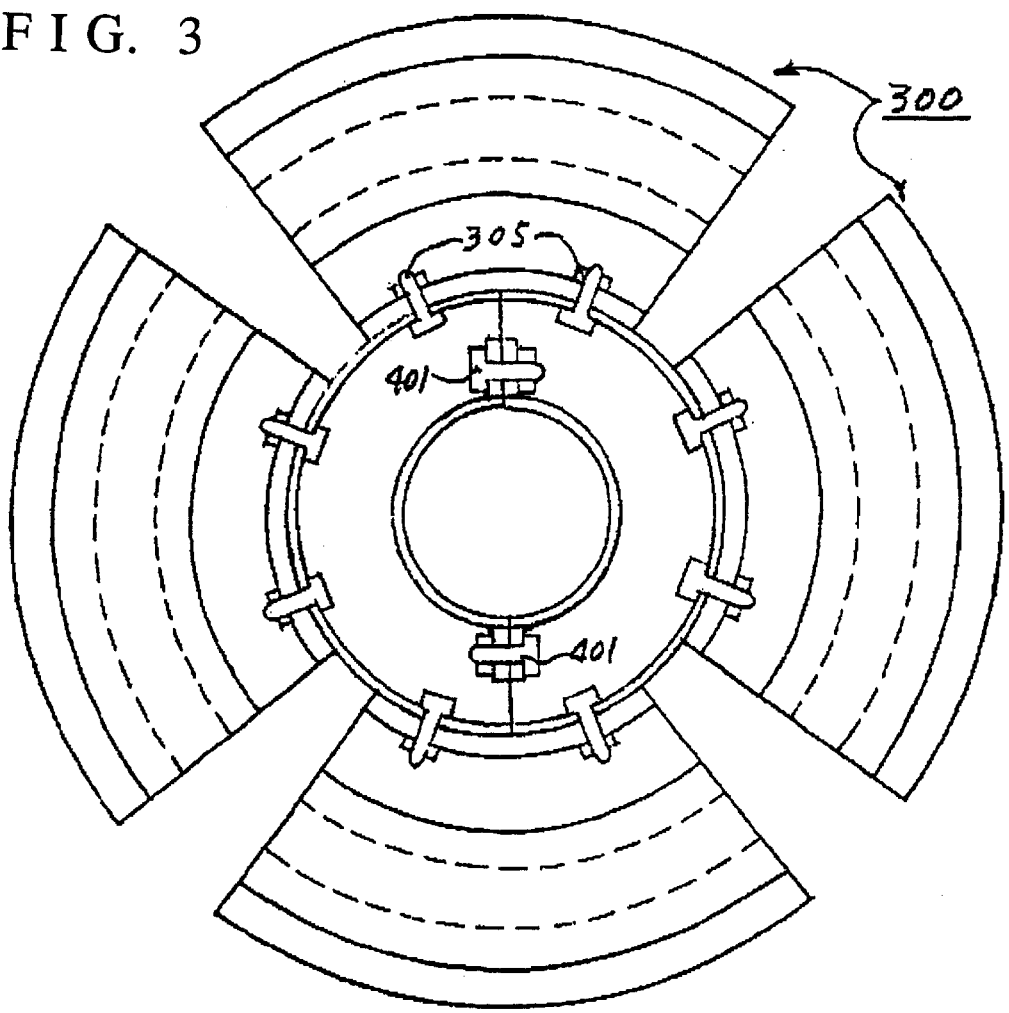
FIG. 3 is a side view of the buttress in the tire of FIG. 1.

The saddle 400 provides a secure platform for anchoring the buttress 300. FIG. 3 depicts the side view of the buttress system 300 and the saddle 400. The saddle portion 400 includes two sections, as shown, to facilitate assembly onto the wheel rim 500. The two sections of the saddle 400 are bolted together with the bolts and nuts 401. Once assembled, the saddle 400 is snugly and securely fitted around a bottom wheel rim portion 501 of a wheel rim 500. FIG. 3 also shows that the buttress system 300 may be partitioned for ease of assembly on the saddle 400. It is preferable that to minimize the space between pieces of the buttress.

The operation of the tire according to the preferred embodiment of the present invention will now be explained.

Figure 2:
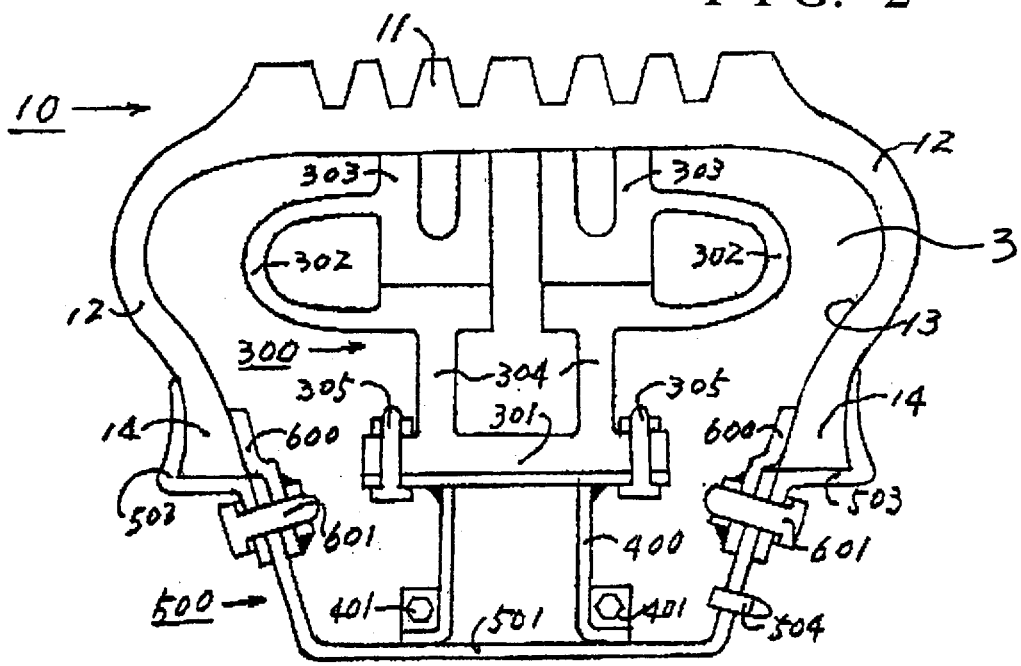
FIG. 2 depicts a punctured condition of the road-contact portion of FIG. 1.

FIG. 2 depicts the road-contact portion under the condition of the tire when there is a puncture in the chamber 3 and the air pressure in the chamber 3 is lost. Even though the air pressure in the chamber 3 is lost, the tire body 10 does not separate from the wheel rim 500 because the doubly acute bead 14 of the tire body 10 is securely clamped with the clamping system including the clamping piece 600 and the upper cupping part 503 and the top surface of the side wheel rim portion 502 on both sides of the tire. In addition, without the air pressure supporting the separation between the upper ribs 303 from the ribs 304 in the ribbed bottom portion 301 of the buttress 300, the upper ribs 303 moves down (inwardly) and ultimately rests directly on the ribs 304. The shape of the side portions 302 of the buttress 300 and the shape of the side walls 12 of the tire body 10 are only minimally changed.

More importantly, even though there is no air pressure at all in the tire, there is still some flexibility and cushioning provided by the ribs of the buttress system to continue the use of the tire for stable control of the vehicle. The upper ribs 303 are supported by the ribs 304, which are in turn supported by the saddle 400. The load on the tire body 10 is transferred along the continuous support of the ribs in the buttress 300. With the ribbed support and the grooves in ribs, the buttress system according to the present invention provides flexibility and cushioning, even in the punctured condition depicted in FIG. 2.

The above-described preferred embodiment of the present invention is a single chambered tire which provides cushioning during both normal operation and after a puncture to the tire. After a single or multiple puncture, the tire body 10 does not separate from the wheel rim 500, the road-contact portion of the tire is maintained without excessive deformation of the tire, and the load on the tire is safely and stably transmitted through internal ribs within the buttress system of the present invention. Therefore, vehicle stability and control is maintained even after punctures of the tire. When the chamber 3 is punctured, the ribs in the buttress system provide the continued flexibility and the appropriate cushioning the support the load changes in all directions resulting from the road condition and the handling of the vehicle. Accordingly, the tire of the present invention is considered to be a bullet proof tire. The single-chambered tire of the preferred embodiment of the present invention may be used in the same manner as conventional tires.

While the preferred embodiment of the present invention and the benefits thereof were described above, the present invention is not limited thereto and may include other variations. For instance, the shape of the curved side walls 302 may be changed to the straight walls. The doubly acute bead 14 may be changed to have the acute shape on one side and a round bead on the other side. Sealing may be made by the sealing rings between the side wheel rim portion 502 and the upper cupping portion 503. The saddle 400 may be omitted (such as for a small tire), in which case the anchoring rib 301 is anchored directly to the bottom wheel portion 501 by the bolts and nuts 305.

Furthermore, although a preferred embodiment of the present invention has been described, it would be appreciated by those skilled in the art that changes may be made in these embodiments without departing form the principles and spirit of the invention, the scope of which is defined in the claims and their equivalents.

What is claimed is:

1. A tire and rim assembly comprising:

a wheel rim;

a tire body having a tread portion and doubly acute beads, said doubly acute beads being secured to said wheel rim with a clamping piece; and a buttress disposed within said tire body to buttress a tire deflation, said buttress having:

an upper rib contacting an inner side of the tread portion at normal inflation of said tire;

a lower rib attached to said wheel rim, said upper and lower ribs being spaced apart from each other at the normal inflation of said tire and being adapted to come into contact with each other during said tire deflation; and curved side walls connecting said upper and lower ribs, wherein said buttress is divided into multiple sections around said wheel rim, and wherein said doubly acute beads, in a cross-sectional view, have an acute bulged portion on both sides thereof accommodated in a cupping surface of an upper cupping part of the wheel rim.

2. A tire and rim assembly as recited in claim 1, further comprising a saddle fitted around said wheel rim, and wherein said lower rib of said buttress is attached to said saddle.

3. A tire and rim assembly recited in claim 2, wherein the saddle is divided into multiple sections.

4. A tire and rim assembly as recited in claim 1, wherein said tread portion is cushioned by said upper and lower ribs of said buttress during said tire deflation.

5. A tire and rim assembly recited in claim 1, wherein a cross-section of said ribs has a pillar shape and said upper rib further includes a groove extending through the pillar shape in a direction around the tire.

6. A tire and rim assembly as recited in claim 1, wherein said clamping piece is divided into multiple sections.

* * * * *

UNITED STATES PATENT AND TRADEMARK OFFICE
CERTIFICATE OF CORRECTION

PATENT NO. : 6,401,773 B1
DATED : June 11, 2002
INVENTOR(S) : Woon Je Cho

It is certified that error appears in the above-identified patent and that said Letters Patent is hereby corrected as shown below:

Title page,
Item [76], Inventor: "Woon Je Cho, 2550 Kingston Road, Scarborough (CA), M1M1L7" should be -- Woon Je Cho, 155 Market Street Apt. 1109 Hamilton, Ontario (CA), L8R3H5 --

Signed and Sealed this

Seventeenth Day of December, 2002

JAMES E. ROGAN
*Director of the United States Patent and Trademark Office*